(12) United States Patent
Yuan (10) Patent No.: US 9,395,785 B2
(45) Date of Patent: Jul. 19, 2016

(54) METHOD AND DEVICE FOR CONTROLLING TERMINAL AND TERMINAL THEREOF

(71) Applicant: Tencent Technology (Shenzhen) Company Limited, Shenzhen (CN)

(72) Inventor: Cancai Yuan, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 277 days.

(21) Appl. No.: 14/022,031

(22) Filed: Sep. 9, 2013

(65) Prior Publication Data

US 2014/0025971 A1    Jan. 23, 2014

Related U.S. Application Data

(63) Continuation of application No. PCT/CN2013/079690, filed on Jul. 19, 2013.

(30) Foreign Application Priority Data

Jul. 19, 2012 (CN) .......................... 2012 1 0250616

(51) Int. Cl.
*G06F 1/32* (2006.01)

(52) U.S. Cl.
CPC *G06F 1/32* (2013.01); *G06F 1/324* (2013.01); *G06F 1/3206* (2013.01); *G06F 1/3296* (2013.01); *Y02B 60/1217* (2013.01); *Y02B 60/1285* (2013.01)

(58) Field of Classification Search
CPC ............... G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS 6,711,447 B1 * 3/2004 Saeed .............................. 700/82
2009/0295794 A1 * 12/2009 Fan et al. ...................... 345/419
2011/0283117 A1    11/2011 Krig (Continued)

FOREIGN PATENT DOCUMENTS

CN        101910975 A    12/2010
CN        201725272 U     1/2011

(Continued)

OTHER PUBLICATIONS

Tencent Technology, ISRWO, PCT/CN2013/079690, Oct. 31, 2013, 8 pgs.
Tencent Technology, IPRP, PCT/CN2013/079690, Jan. 20, 2015, 6 pgs.

*Primary Examiner* — Thomas Lee
*Assistant Examiner* — Mohammad A Rahman
(74) *Attorney, Agent, or Firm* — Morgan, Lewis & Bockius LLP (57) ABSTRACT

A method and device for controlling a terminal and a terminal. The method includes: checking the hardware of a terminal to obtain corresponding hardware information; and controlling the terminal according to the hardware information obtained thereby, where the hardware includes at least one of a CPU and a GPU, and the hardware information includes at least one of the voltage information and the frequency information about the hardware. The device includes: a checking module and a control module.

20 Claims, 7 Drawing Sheets

Checking the hardware of a terminal to obtain corresponding hardware information, with the hardware comprising at least one of CPU and GPU and the hardware information comprising at least one of voltage information and frequency information about the hardware — 101

Controlling the terminal according to the obtained hardware information — 102

(56) References Cited

U.S. PATENT DOCUMENTS

| | | | |
|---|---|---|---|
| 2012/0011377 A1* | 1/2012 | Yu et al. | 713/300 |
| 2013/0054989 A1* | 2/2013 | Judd | 713/320 |
| 2013/0191665 A1* | 7/2013 | Mehta et al. | 713/322 |

FOREIGN PATENT DOCUMENTS

| | | |
|---|---|---|
| CN | 102510422 A | 6/2012 |
| CN | 102799489 A | 11/2012 |
| KR | 1020100113554 | 10/2010 |

* cited by examiner

METHOD AND DEVICE FOR CONTROLLING TERMINAL AND TERMINAL THEREOF

RELATED APPLICATION

This application is a continuation application of PCT Patent Application No. PCT/CN2013/079690, entitled "METHOD AND DEVICE FOR CONTROLLING TERMINAL AND TERMINAL THEREOF" filed on Jul. 19, 2013, which claims priority to Chinese Patent Application No. 201210250616.5, entitled "METHOD AND DEVICE FOR CONTROLLING TERMINAL AND TERMINAL THEREOF", filed on Jul. 19, 2012, both of which are hereby incorporated by reference in its entirety.

TECHNICAL FIELD

The disclosed embodiments relate to the field of computer technology, and particularly, to a method, device for controlling a terminal, and a terminal thereof.

BACKGROUND

With the continuous extending of the functions of a terminal, more and more application programs are installed in the terminal. In the case that the performance of the hardware of the terminal is relatively constant, the increasing of application programs running in the terminal and the increasing of complexity leads to the operation speed of the terminal system becoming slower, affecting the usage of the terminal. Thus, there is a need to take corresponding control measures at the terminal, so as to optimize terminal performance and save resources.

In the prior art, when a terminal is controlled, applications running in the terminal are closed according to memory usage at the terminal, so as to clear the memory occupied by the application program, optimizing terminal performance.

As described above, in the prior art, application programs running in the terminal are closed according to memory usage at the terminal, so as to control the terminal and further optimize terminal performance. However, this manner of resource conservation is limited in its effectiveness. Even if the terminal is in a sleep or idle state, the hardware of the terminal is still in an operational state, causing unnecessary resource consumption. In addition, because many application programs can restart quickly after having been closed, the effectiveness of terminal performance optimization through the terminal control methods adopted in the prior art is not very good.

SUMMARY

In order to improve the effect of terminal performance optimization and to save resources, a method and device for controlling a terminal and a terminal are provided. The technical solution is as follows.

In one aspect, a method for controlling a terminal is provided. The method includes: checking hardware of a terminal to obtain corresponding hardware information, and controlling the terminal according to the obtained hardware information, where the hardware includes at least one of a central processing unit (CPU) and a graphics processing unit (GPU), and the hardware information includes at least one of voltage information and frequency information about the hardware.

In another aspect, a device for controlling a terminal is provided. The device includes: a checking module configured to check hardware of a terminal to obtain corresponding hardware information, where the hardware includes at least one of a central processing unit (CPU) and a graphics processing unit (GPU), and the hardware information includes at least one of the voltage information and the frequency information about the hardware; and a control module configured to control the terminal according to the hardware information obtained by checking by the checking module.

In yet another aspect, a terminal is also provided, the terminal comprising any one of the above-mentioned devices for controlling a terminal.

In yet another aspect, a non-transitory computer readable storage medium stores one or more program modules for execution by one or more processors of a computing device for controlling a terminal, the one or more program modules including: a checking module configured to check hardware of a terminal to obtain corresponding hardware information, wherein the hardware comprises at least one of a central processing unit (CPU) and a graphic processing unit (GPU), and the hardware information comprises at least one of the voltage information and the frequency information about the hardware; and a control module configured to control the terminal according to the hardware information obtained by checking by the checking module.

The advantages brought by the technical solution provided in the embodiments of the present invention include: by way of checking the hardware of a terminal, such as CPU, GPU, and so on, so as to control the terminal according to the obtained hardware information such as frequency, voltage, and so on, thus realizing controlling the terminal according to the actual situation of the hardware of the terminal, reducing the resource consumption caused by the hardware, further improving the optimization effect of terminal performance, and saving resources.

BRIEF DESCRIPTION OF THE DRAWINGS

In order to describe the technical solution of the embodiments of the present invention more clearly, drawings needed to be used in the description of the embodiments will be briefly introduced below. It should be apparent that the drawings described below are merely illustrative of some embodiments of the present invention, and for those skilled in the art, on the premise of no inventive effort being involved, other drawings may also be obtained according to these drawings.

DESCRIPTION OF EMBODIMENTS

In order to make the objects, technical solution and advantages of the present invention more clearly, the embodiments of the present invention will be further described in detail below in conjunction with the drawings.

Figure 1:
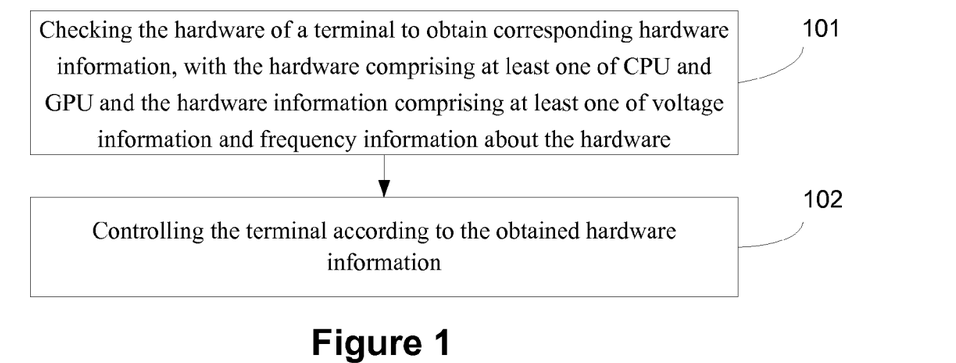
FIG. 1 is a flowchart of a method for controlling a terminal in accordance with some embodiments.

The present embodiment provides a method for controlling a terminal, and referring to FIG. 1, the flow of the method provided in this embodiment is as follows.

Step 101: Checking hardware of a terminal to obtain corresponding hardware information, where the hardware includes at least one of a central processing unit (CPU) and a graphic processing unit (GPU), and the hardware information includes at least one of voltage information and frequency information about the hardware.

The terminal in this embodiment and the other embodiments described herein includes, but is not limited to, such terminals as a cell phone, a personal computer, and so on, and the particular type of terminal is not limited by this embodiment or the other embodiments described herein.

In some embodiments, after the checking the hardware of the terminal to obtain corresponding hardware information, the method includes: analyzing current performance of the hardware according to the obtained hardware information, and presenting the analysis result.

In some embodiments, the method further includes, before analyzing the current performance of the hardware according to the obtained hardware information: setting a relationship between hardware information and hardware performance, with hardware information in different ranges corresponding to different performance values. Analyzing the current performance of the hardware according to the obtained hardware information includes: making a query about a performance value corresponding to the obtained hardware information according to the set relationships between the hardware information and the hardware performance, and taking the performance value obtained by the query as the analysis result.

In some embodiments, the method further includes, after checking the hardware of the terminal to obtain corresponding hardware information: generating an alert of a power consumption warning if the obtained hardware information exceeds a threshold.

In some embodiments, the method further includes, after checking the hardware of the terminal to obtain corresponding hardware information: displaying a list of currently running application programs if the obtained hardware information exceeds the threshold, and closing an application program selected by a user in the list of application programs.

Step 102: Controlling the terminal according to the obtained hardware information.

In some embodiments, the method further includes, before controlling the terminal according to the obtained hardware information: setting one or more hardware operation modes, with different hardware operation modes corresponding to hardware information in different ranges. The hardware operation modes include at least one of a low power consumption mode, a normal mode, a high power consumption mode and an intelligent mode. Controlling a terminal according to the obtained hardware information includes: determining a corresponding hardware operation mode according to the obtained hardware information, and controlling the hardware of the terminal to operate under the corresponding hardware operation mode.

In some embodiments, the different hardware operation modes corresponding to hardware information in different ranges include: a low power consumption mode corresponding to hardware information in a first preset range; normal mode corresponding to hardware information in a second preset range; high power consumption mode corresponding to hardware information in a third preset range; and intelligent mode corresponding to hardware information in one of the ranges for switching the hardware operation mode among the low power consumption mode, the normal mode, the high power consumption mode according to the obtained hardware information; wherein the first preset range is less than the second preset range and the second preset range is less than the third preset range.

The method provided in the present embodiment checks the hardware of a terminal, such as CPU, GPU, and so on, so as to control the terminal according to the obtained hardware information, such as frequency, voltage, and so on, thereby realizing controlling the terminal according to the actual situation of the hardware of the terminal, reducing the resource consumption caused by the hardware, further improving the optimization effect of terminal performance, and saving resources.

In order to further describe the method provided in the above embodiment, in combination with the description above, the method for controlling a terminal provided in the above embodiment will be explained in detail by way of taking the following embodiment as an example.

Figure 2:
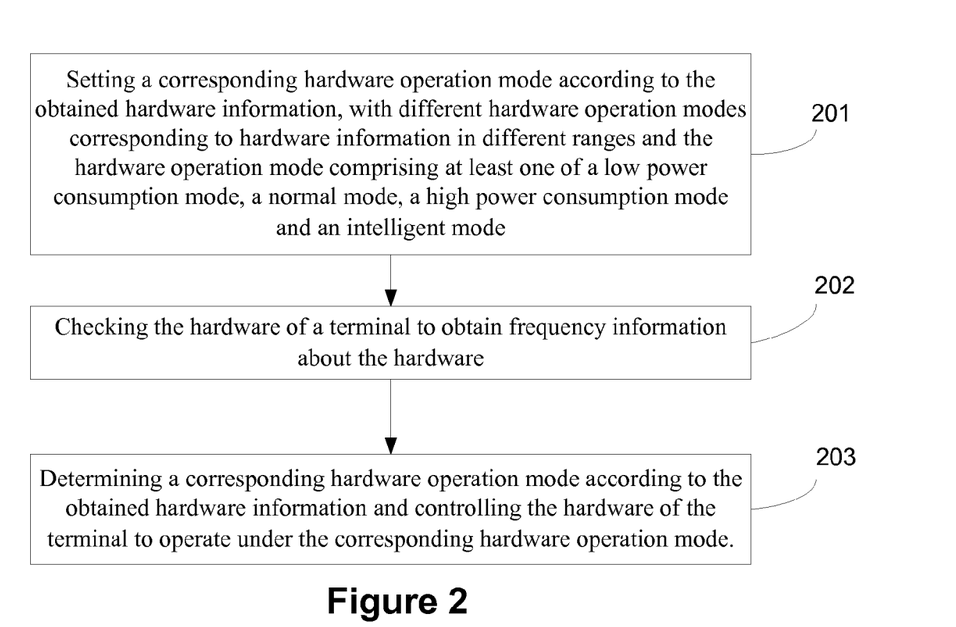
FIG. 2 is a flowchart of a method for controlling a terminal in accordance with some embodiments.

The present embodiment provides a method for controlling a terminal, in combination with the content of the abovementioned embodiment. For the sake of ease of description, the method provided in this embodiment will be described by way of an example in which the obtained hardware information is frequency information about the hardware after checking the hardware of the terminal. Referring to FIG. 2, the flow of the method provided in this embodiment is specifically as follows:

Step 201: Setting one or more hardware operation modes, with different hardware operation modes corresponding to hardware information in different ranges and the hardware operation modes including at least one of a low power consumption mode, a normal mode, a high power consumption mode and an intelligent mode.

When setting the hardware operation modes, the setting is performed according to the type of the hardware information, with different hardware operation modes corresponding to hardware information in different ranges. For example, if the hardware information is frequency information, the corresponding hardware operation mode is set according to the frequency information about the hardware; and if the hardware information is voltage information, the corresponding hardware operation mode is set according to the voltage information about the hardware. The setting of the corresponding hardware operation mode(s) is described below by way of an example in which the hardware of the terminal is one or more CPUs and the hardware information is frequency information of the CPU(s).

In some embodiments, different hardware operation modes corresponding to hardware information in different ranges are set as follows: the low power consumption mode corresponds to hardware information in a first preset range; the normal mode corresponds to hardware information in a second preset range; the high power consumption mode corresponds to hardware information in a third preset range; and the intelligent mode corresponds to hardware information in any of the ranges. In the intelligent mode, the terminal switches the hardware operation mode among the low power consumption mode, the normal mode, and the high power consumption mode according to the obtained hardware information. The first preset range is less than the second preset range and the second preset range is less than the third preset range.

In particular implementation, this embodiment does not define a hardware information range corresponding to each hardware operation mode, that is, particular values for the first preset range, the second preset range and the third preset range are not defined here. Because the frequency range of the CPU is different for each kind of terminal, the hardware information range can be expressed as a percentage, for example, and the corresponding hardware operation mode is set according to the frequency percentage of the CPU. For example, the hardware operation mode is set as the low power consumption mode for the hardware the frequency of which is lower than 40%. If the terminal (e.g., cell phone) is in the low power consumption mode, the most energy savings and least heat consumption can be achieved while maintaining general usage requirements of the cell phone. The hardware operation mode is set as the normal mode for the hardware the frequency of which is within 40-80%. If the cell phone is in the normal mode, the user is allowed to enjoy more functions, while partially saving energy and reducing heat consumption. The hardware operation mode is set as the high power consumption mode for the hardware the frequency of which is higher than 80%. If the cell phone is in the high power consumption mode, the cell phone can run some application programs which occupy a large volume of hardware resources, without affecting normal usage of the cell phone. The intelligent mode corresponds to any of the ranges, and is used to switch the hardware operation mode among the abovementioned modes (low power consumption, normal power consumption, high power consumption) according to particular hardware information. If the cell phone is in the intelligent mode, it can be judged that the cell phone is to be in the low power consumption, normal power consumption, or high power consumption mode according to the usage situation of the hardware of the cell phone, which is more convenient for the user.

Of course, besides setting according to the above-mentioned values, the frequency range corresponding to each of the abovementioned hardware operation modes can be adjusted according to actual situation, and There is no confinement for the frequency information corresponding to each hardware operation mode in this embodiment, nor for the way to set the hardware operation mode according to the hardware information.

Step 202: Checking the hardware of a terminal to obtain the frequency information about the hardware.

For this step, when the hardware of the terminal is checked, the checking can be realized through underlying hardware, and the particular checking manner is not defined in this embodiment. In addition, as to the trigger for checking the hardware of the terminal, in practical application, the checking can be triggered actively by the user. For example, a checking option can be set in the terminal, and if this option is selected by the user, the underlying hardware is triggered to check the hardware of the terminal. The checking can also be triggered periodically. For example, the hardware of the terminal can be periodically checked automatically according to the time set by the user. Besides these, there can be other triggering manners, and the particular triggering manner is not defined in this embodiment.

Optionally, after checking the hardware of the terminal to obtain the frequency information about the hardware, in order to enable the user to be aware of and know the hardware performance of the terminal, the method provided in this embodiment further includes: after having checked the hardware of the terminal to obtain corresponding hardware information, analyzing the current performance of the hardware according to the obtained hardware information and presenting the analysis result. When analyzing the current performance of the hardware according to the obtained hardware information, the performance of the hardware can graded with a score according to specific hardware information, and the score can be presented as an analysis result. During practical implementation, before the analyzing the current performance of the hardware according to the obtained hardware information, a relationship between hardware information and hardware performance is preset, with hardware information in different ranges corresponding to different performance values or scores. Accordingly, analyzing the current performance of the hardware according to the obtained hardware information includes: making a query for a performance value corresponding to the obtained hardware information according to the preset relationship between the hardware information and the hardware performance, and taking the performance value obtained by the query as the analysis result.

Taking as an example that the hardware information is the frequency information of the hardware, the frequency range of the CPU of each terminal is constant, and an excessive frequency range is estimated according to the frequency range values of the CPU of each terminal, further grading a score, with different score values indicating different hardware performance, and the graded score value can be adjusted in the particular case, being relative. For example, presetting a relationship between the frequency of the CPU and the performance of the CPU, where the performance value of the hardware corresponding to a frequency in the frequency range of 0 to 100 is set as a score value of 1, the performance value of the hardware corresponding to a frequency in the frequency range of 100 to 200 is set as a score value of 2, the performance value of the hardware corresponding to a frequency in the frequency range of 200 to 300 is set as a score value of 3, and so forth. If the current CPU frequency obtained by checking is 168, the preset relationship is queried to obtain the corresponding performance value 2, and if the current CPU frequency obtained by checking is 260, the preset relationship is queried to obtain the corresponding performance value 3. In practical application, the particular grading standard is not defined in this embodiment, and besides analyzing the current performance of the hardware in the score-grading way, other analysis methods can be chosen, and the particular analysis method and the presented analysis result are not defined in this embodiment.

Optionally, in this step, after checking the hardware of the terminal to obtain corresponded hardware information, when the current hardware information indicates that the current terminal is in the high power consumption mode, the method provided in this embodiment further includes, after checking the hardware of the terminal to obtain corresponded hardware information: if the obtained hardware information exceeds a threshold, generating an alert of a power consumption warning.

The practical size of the abovementioned threshold is not defined in this embodiment, and can be set depending on practical application. For example, if the hardware information is the frequency information about the hardware, the threshold can be set as 80%. Hardware information in which the frequency is higher than 80% is deemed as having exceeded the threshold. That is, the terminal is currently in a high power consumption mode state, and accordingly, in order to not affect the operation of the terminal, a power consumption warning is prompted. In particular prompting, a prompting bar can be popped up to early warn the current energy consumption of the terminal, so as to prompt the user to take corresponding energy consumption reduction measures, for example, closing some running application programs. Of course, besides popping up a prompt bar to make a prompt about a power consumption warning, energy consumption warning can be also performed in other ways, which is not defined in this embodiment.

Optionally for the above-mentioned situation in which the obtained hardware information exceeds the threshold, besides generating an alert of a power consumption warning, the method provided in this embodiment further includes, after checking the hardware of the terminal to obtain corresponded hardware information: displaying a list of currently running application programs if the obtained hardware information exceeds the threshold, and closing an application program selected by a user in the list of application programs.

For example, when the obtained hardware information indicates that the energy consumption of the terminal is too high, whether the user is making an operation (e.g., the user is using an application or program in the terminal) can be determined. If it is determined that the user is using an application program, a list of running application programs is displayed to alert the user of an excessive frequency and/or to prompt the user to close a program, so as to avoid affecting the operating speed of the terminal, and after the user selects an application program in the list of application programs, the application program selected by the user is closed, so as to save the resources occupied by the closed application program. If the energy consumption is still too high when the screen is locked or no user operation is performed, some running application programs can be closed to reduce power consumption, saving resources.

Step 203: Determining a corresponding operation mode according to the frequency information about the hardware obtained by checking, and controlling the hardware of the terminal within the corresponding hardware operation mode.

Particularly, after the corresponding hardware operation mode is set in abovementioned step 201 and the corresponding hardware information is obtained by checking in abovementioned step 202, in step 203 the terminal determines which corresponding hardware operation mode should the hardware currently be operating in according to the frequency information about the hardware obtained by the checking in step 202. If the current hardware operation mode is not in conformance with the determined hardware operation mode, a recommendation is made to the user, so as to trigger control of the hardware of the terminal in the corresponding hardware operation mode. For example, say that the current hardware operation mode of the terminal is the normal mode, and when the terminal has been in a high frequency operating environment for a time period, the speed becomes slow probably due to the running of a large program. It is found out through checking the hardware of the terminal that the obtained hardware information should correspond to the high power consumption mode. Thus, by way of popping up an option box, the user is prompted to adjust the current hardware operation mode of the terminal into the high power consumption mode, so as to satisfy the current operation frequency requirements through the high power consumption mode, making the application program currently running in the terminal run more smoothly, while normal usage of the terminal is not affected.

It should be noted that, in abovementioned embodiment, the method for controlling a terminal is merely illustrated by way of an example that the hardware information is frequency information, and in practical application, the hardware of a terminal comprises is not limited to CPU, GPU and so on, and the hardware information includes but not limited to frequency information, voltage information and so on. No matter which kind of hardware in the terminal is checked and which kind of hardware information is obtained, the method for controlling a terminal according to the obtained hardware information can be implemented likewise, referring specifically to the description of the abovementioned steps 201 to 203 in this embodiment, and will no longer be explained in further detail herein.

The method provided in the present embodiment checks the hardware of the terminal, such as CPU, GPU, and so on, so as to control the terminal according to the obtained hardware information, such as frequency, voltage, and so on, thereby realizing controlling the terminal according to the actual situation of the hardware of the terminal, reducing the resource consumption caused by the hardware, further improving the optimization effect of terminal performance, and saving resources.

Figure 3:
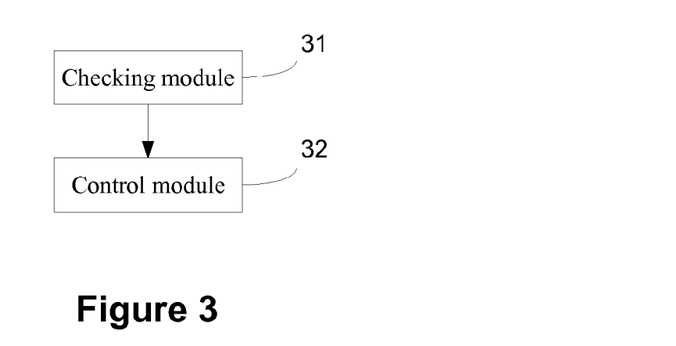
FIG. 3 is a structural schematic diagram of a first device for controlling a terminal in accordance with some embodiments.

The present embodiment provides a device for controlling a terminal, which device is used to execute the method for controlling a terminal provided in the abovementioned embodiments. Referring to FIG. 3, the device includes: a checking module 31 configured to check hardware of a terminal to obtain corresponding hardware information, where the hardware includes at least one of CPU and GPU, and the hardware information includes at least one of the voltage information and the frequency information about the hardware; and a control module 32 configured to control the terminal according to the obtained hardware information module 31.

Reference for the detail of the way that the checking module 31 checks the hardware of the terminal is made to relevant description of the step 202 in the abovementioned embodiments, and will no longer be described in further detail herein. Reference for the detail of the way that the control module 32 controls the terminal according to the obtained hardware information is made to relevant description of the step 203 in the abovementioned embodiments, and will no longer be described in further detail herein.

Figure 4:
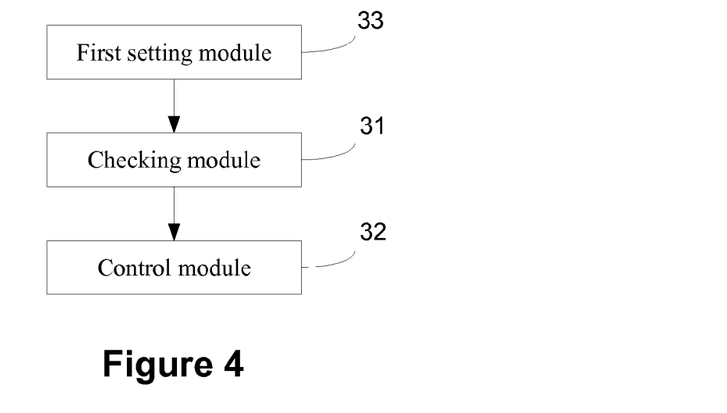
FIG. 4 is a structural schematic diagram of a second device for controlling a terminal in accordance with some embodiments.

Optionally, in combination with relevant description of step 201 in the abovementioned embodiments, referring to FIG. 4, the device further includes: a first setting module 33 configured to set one or more hardware operation modes, with different hardware operation modes corresponding to hardware information in different ranges and the hardware operation modes includes at least one of a low power consumption mode, a normal mode, a high power consumption mode and an intelligent mode.

Figure 5:
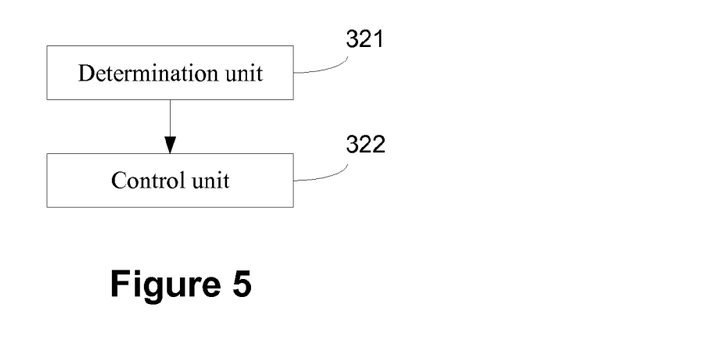
FIG. 5 is a structural schematic diagram of a control module in accordance with some embodiments.

Referring to FIG. 5, in combination with relevant description of step 203 in abovementioned embodiments, the control module 32 includes: a determination unit 321 configured to determine a corresponding hardware operation mode set by the first setting module 33 according to the obtained hardware information module 31; and a control unit 322 configured to control the hardware of the terminal to operate under the corresponding hardware operation mode determined by the determination unit 321.

Optionally, different hardware operation modes set by the first setting module 33 corresponding to hardware information in different ranges is as follows in particular: the low power consumption mode corresponds to hardware information in a first preset range; the normal mode corresponds to hardware information in a second preset range; the high power consumption mode corresponds to hardware information in a third preset range; and the intelligent mode corresponds to hardware information in any of these ranges, for switching the hardware operation mode among the low power consumption mode, the normal mode, the high power consumption mode according to the obtained hardware information; where the first preset range is less than the second preset range and the second preset range is less than the third preset range.

Figure 6:
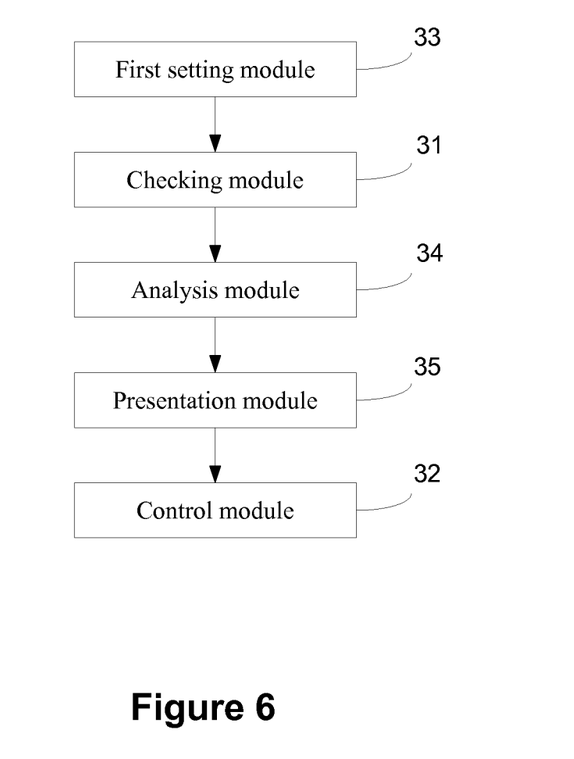
FIG. 6 is a structural schematic diagram of a third device for controlling a terminal in accordance with some embodiments.

Optionally, in combination with relevant description of step 202 in the abovementioned embodiments, referring to FIG. 6, the device further includes: an analysis module 34 configured to analyze the current performance of the hardware according to the obtained hardware information module 31; and a presentation module 35 configured to present the analysis result obtained by the analysis module 34.

Figure 7:
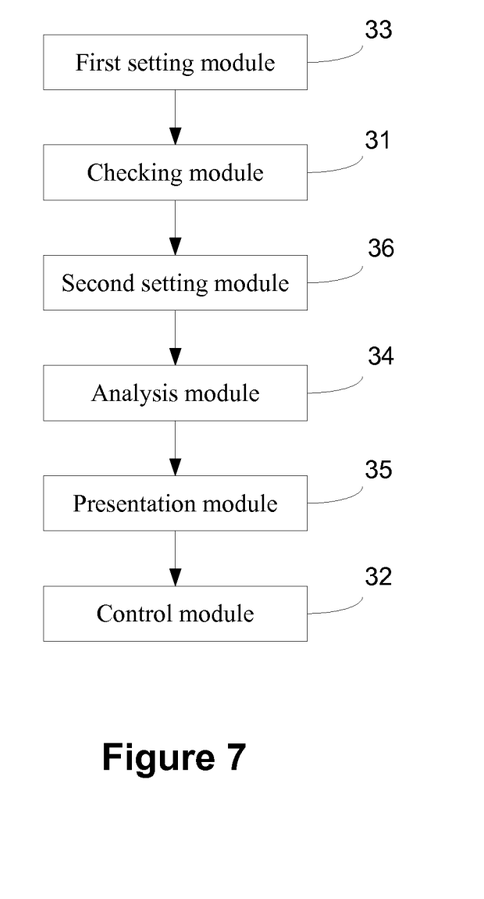
FIG. 7 is a structural schematic diagram of a fourth device for controlling a terminal in accordance with some embodiments.

Optionally, referring to FIG. 7, the device further includes: a second setting module 36 configured to preset a relationship between hardware information and hardware performance, with hardware information in different ranges corresponding to different performance values.

The analysis module 34 is particularly used to make a query for a performance value corresponding to the obtained hardware information according to the relationship between the hardware information and the hardware performance preset by the second setting module 36, and take the performance value obtained by the query as the analysis result.

Figure 8:
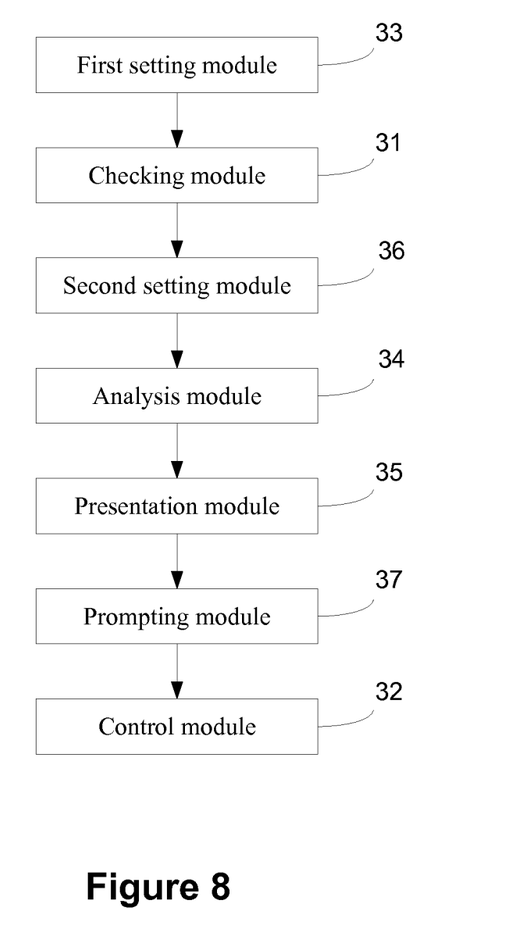
FIG. 8 is a structural schematic diagram of a fifth device for controlling a terminal in accordance with some embodiments.

Optionally, in combination with relevant description of step 202 in the abovementioned embodiments, referring to FIG. 8, the device further includes: a prompting module 37 configured to make a prompt about a power consumption early warning if the hardware information obtained by checking by the checking module 31 exceeds a threshold.

Figure 9:
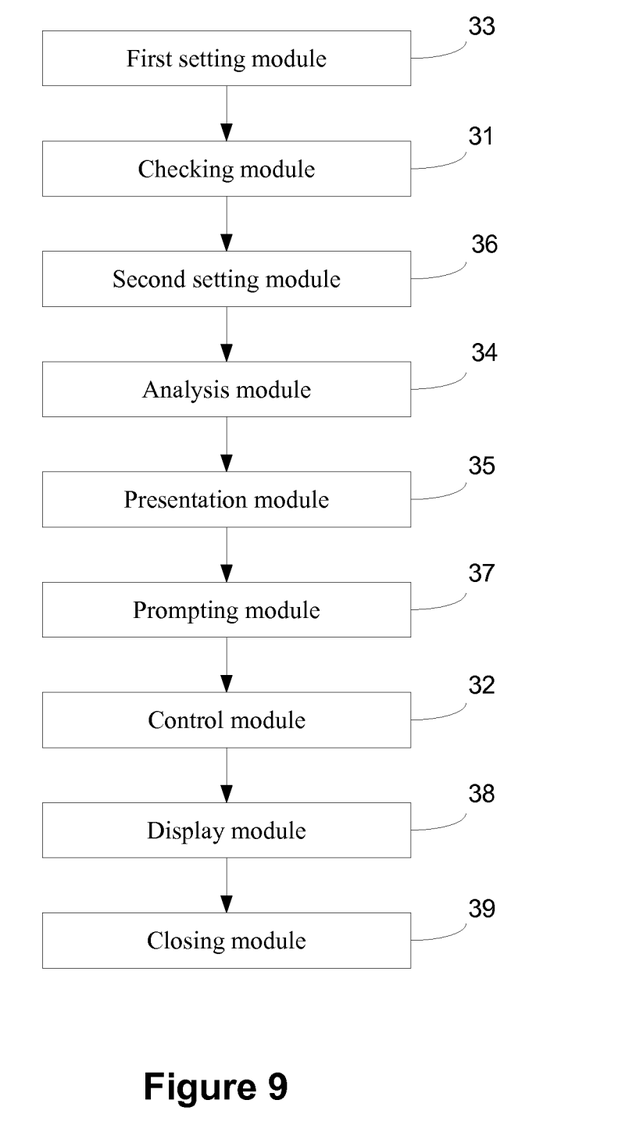
FIG. 9 is a structural schematic diagram of a sixth device for controlling a terminal in accordance with some embodiments.

Optionally, in combination with relevant description of step 202 in the abovementioned embodiments, referring to FIG. 9, the device further includes: a display module 38 configured to display a list of currently running application programs if the hardware information obtained by checking by the checking module 31 exceeds the threshold; and a closing module 39 configured to close an application program selected by a user in the list of application programs displayed by the display module 38.

The device provided in the present embodiment checks the hardware of a terminal, such as CPU, GPU, and so on, so as to control the terminal according to the obtained hardware information such as frequency, voltage, and so on, thereby realizing controlling the terminal according to the actual situation of the hardware of the terminal, reducing the resource consumption caused by the hardware, further improving the optimization effect of terminal performance, and saving resources.

The present embodiment provides a terminal, which terminal includes the device for controlling a terminal provided in the abovementioned embodiments.

The terminal provided in the present embodiment, by way of checking the hardware such as CPU and GPU and so on of the terminal with a device for controlling a terminal, realizes controlling the terminal according to the obtained hardware information such as frequency, voltage, and so on, thereby realizing controlling the terminal according to the actual situation of the hardware of the terminal, reducing the resource consumption caused by the hardware, further improving the optimization effect of terminal performance, and saving resources.

It should be noted that when the device for controlling a terminal provided in the abovementioned embodiments controls a terminal, the division of the above-mentioned various functional modules is merely taken as an example for description, and in actual practice, the above-mentioned functions may be assigned to be achieved by different functional modules as required, i.e. dividing the internal structure of the apparatus into different functional modules, so as to achieve all or some of the functions of the above description. In addition, the device for controlling a terminal provided in the above-mentioned embodiments and the method embodiments for controlling a terminal belong to the same concept, and please see the method embodiments for details for the particular realization processes thereof, which will not be described here.

Figure 10:
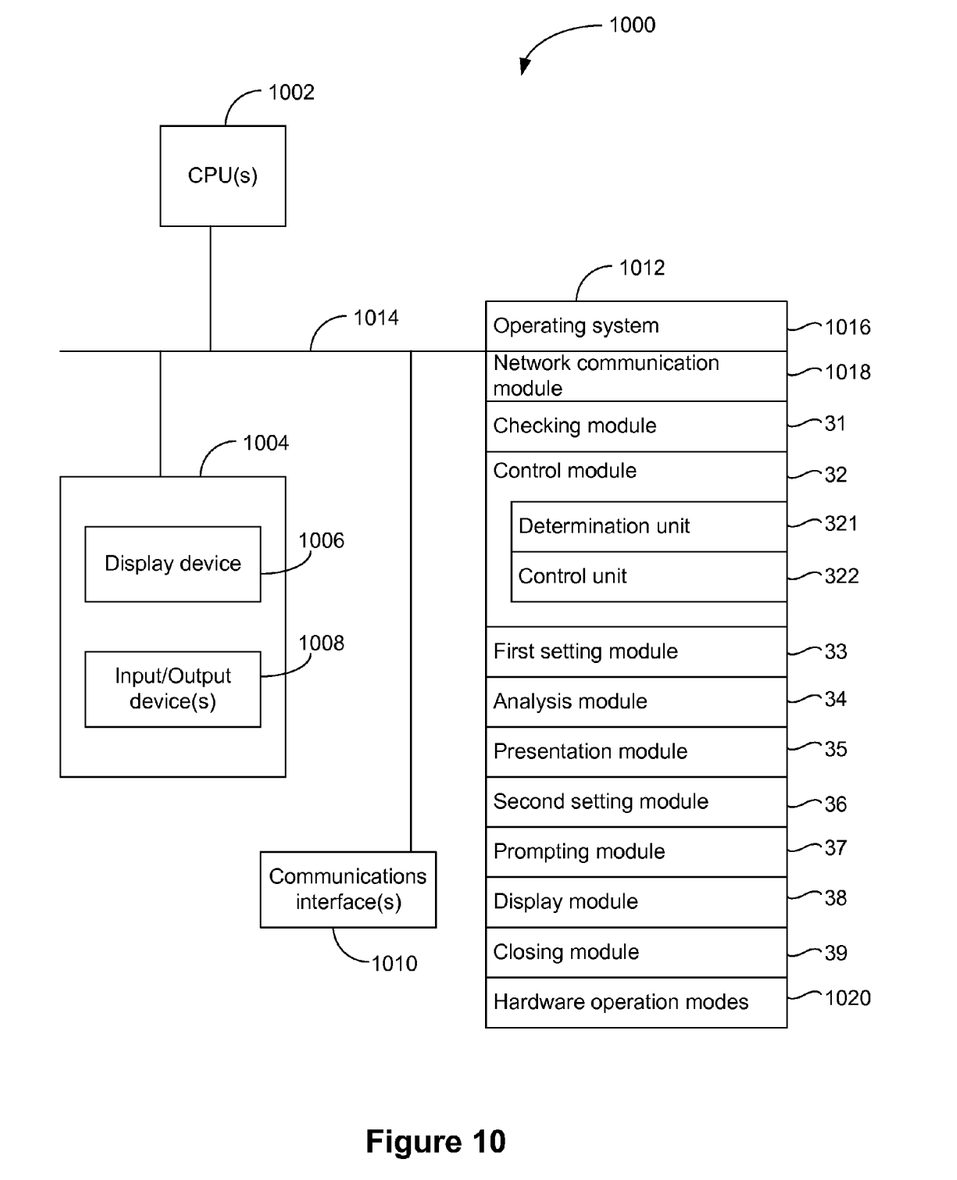
FIG. 10 is a block diagram illustrating a terminal in accordance with some embodiments.

FIG. 10 is a block diagram illustrating a terminal 1000 in accordance with some embodiments of the present invention. The terminal 1000 typically includes one or more processing units (CPU's) 1002 for executing modules, programs and/or instructions stored in memory 1012 and thereby performing processing operations; one or more network or other communications interfaces 1010; memory 1012; and one or more communication buses 1014 for interconnecting these components. The communication buses 1014 optionally include circuitry (sometimes called a chipset) that interconnects and controls communications between system components. The terminal 1000 optionally includes a user interface 1004 comprising a display device 1006 and one or more input device(s) (e.g., keyboard, mouse, touch-sensitive surface) 1008. In some embodiments, an input/output device 1008 is integrated with the display device 1006. For example, a touch screen includes a touch-sensitive surface integrated with the display device 1006. Memory 1012 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1012 may optionally include one or more storage devices remotely located from the CPU(s) 1002. Memory 1012, or alternately the non-volatile memory device(s) within memory 1012, comprises a non-transitory computer readable storage medium. In some embodiments, memory 1012, or the computer readable storage medium of memory 1012 stores the following programs, modules and data structures, or a subset thereof:

- an operating system 1016 that includes procedures for handling various basic system services and for performing hardware dependent tasks;
- a network communication module 1018 that is used for connecting the terminal 1000 to other computers via the one or more communication network interfaces 1010 (wired or wireless) and one or more communication networks, such as the Internet, other wide area networks, local area networks, metropolitan area networks, and so on;
- a checking module 31 for checking hardware of a terminal to obtain corresponding hardware information, where the hardware includes at least one of CPU and GPU, and the hardware information includes at least one of the voltage information and the frequency information about the hardware;
- a control module 32 for controlling the terminal according to the obtained hardware information module 31;
- a first setting module 33 for setting one or more hardware operation modes 1020;
- an analysis module 34 for analyzing the current performance of the hardware according to the obtained hardware information module 31;

a presentation module 35 for presenting the analysis result obtained by the analysis module 34;

a second setting module 36 for presetting a relationship between hardware information and hardware performance, with hardware information in different ranges corresponding to different performance values;

a prompting module 37 for making a prompt about a power consumption early warning if the hardware information obtained by checking by the checking module 31 exceeds a threshold;

a display module 38 for displaying a list of currently running application programs if the hardware information obtained by checking by the checking module 31 exceeds the threshold;

a closing module 39 for closing an application program selected by a user in the list of application programs displayed by the display module 38; and hardware operation modes 1020, which stores definitions of hardware operation modes (e.g., the modes and corresponding ranges of hardware information).

In some embodiments, the control module 32 includes a determination unit 321 for determining a corresponding hardware operation mode set by the first setting module 33 according to the obtained hardware information module 31; and a control unit 322 for controlling the hardware of the terminal to operate under the corresponding hardware operation mode determined by the determination unit 321.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1012 may store a subset of the modules and data structures identified above. Furthermore, memory 1012 may store additional modules and data structures not described above.

Although FIG. 10 shows a "terminal," FIG. 10 is intended more as functional description of the various features which may be present in a set of servers than as a structural schematic of the embodiments described herein. In practice, and as recognized by those of ordinary skill in the art, items shown separately could be combined and some items could be separated.

Those skilled in the art would understand that all or some of the steps for realizing the above-mentioned embodiments can be achieved by hardware, and can also be achieved by instructing relevant hardware by a program, which program can be stored in a computer readable storage medium, and the above-mentioned storage medium can be a read-only memory, a disk or an optical disk.

What are mentioned above are merely preferred embodiments of the present invention, which are not intended to limit the present invention; and any modifications, equivalent substitutions, improvements, etc. made within the spirit and principles of the present invention shall be covered in the scope of protection of the present invention.

What is claimed is:

1. A method for controlling a terminal, comprising:
   receiving and storing definitions of hardware operation modes, wherein each definition of hardware operation mode specifies a preset relationship between hardware information of the terminal and hardware performance of the terminal;
   receiving a user specification of a current hardware operation mode among the hardware operation modes;
   checking hardware of the terminal to obtain current hardware information;
   determining a hardware operation mode corresponding to the obtained current hardware information based on the preset relationship between the hardware information of the terminal and the hardware performance of the terminal; and
   in accordance with a determination that the user specified current hardware operation mode is inferior to the determined hardware operation mode for optimizing the terminal's hardware performance, controlling the hardware of the terminal by performing at least one of:
     enabling the user to replace the user specified current hardware operation mode with the determined hardware operation mode for the current hardware information such that the terminal achieves the hardware performance corresponding to the determined hardware operation mode; and
     recommending a list of currently running application programs for the user to adjust the current hardware information by closing one or more of the recommended applications;
   wherein the hardware comprises at least one of a central processing unit (CPU) and a graphic processing unit (GPU), and the hardware information comprises at least one of voltage information and frequency information about the hardware.

2. The method according to claim 1,
   wherein the hardware operation modes comprise at least one of a low power consumption mode, a normal mode, a high power consumption mode and an intelligent mode.

3. The method according to claim 2, wherein
   the low power consumption mode corresponds to the hardware information in a first preset range;
   the normal mode corresponds to the hardware information in a second preset range;
   the high power consumption mode corresponds to the hardware information in a third preset range; and
   the intelligent mode corresponds to the hardware information in any of the ranges, for switching the hardware operation mode among the low power consumption mode, the normal mode, the high power consumption mode according to the obtained hardware information;
   wherein the first preset range is less than the second preset range and the second preset range is less than the third preset range.

4. The method according to claim 1, further comprising:
   after checking the hardware of the terminal to obtain the current hardware information:
   analyzing current performance of the hardware according to the obtained current hardware information; and
   presenting an analysis result.

5. The method according to claim 4, further comprising:
   analyzing the current performance of the hardware according to the obtained current hardware information comprises: making a query of the stored definitions of hardware operation modes for a performance value corresponding to the obtained hardware information according to the preset relationship between the hardware information of the terminal and the hardware performance of the terminal; and
   taking the performance value obtained by the query as the analysis result.

6. The method according to claim 1, further comprising:
after checking the hardware of the terminal to obtain the current hardware information:
generating an alert of a power consumption warning if the obtained current hardware information exceeds a threshold.

7. The method according to claim 1, further comprising:
after checking the hardware of the terminal to obtain the current hardware information:
displaying the list of currently running application programs if the obtained current hardware information exceeds a threshold; and
closing an application program selected by the user in the list of application programs.

8. A device for controlling a terminal, comprising:
one or more processors;
memory; and
one or more program modules stored in the memory and to be executed by the one or more processors, the one or more program modules including:
a second setting module configured to receive and store definitions of hardware operation modes, wherein each definition of hardware operation mode specifies a preset relationship between hardware information of the terminal and hardware performance of the terminal;
a first setting module configured to receive a user specification of a current hardware operation mode among the hardware operation modes;
a checking module configured to check hardware of the terminal to obtain current hardware information, wherein the hardware comprises at least one of a central processing unit (CPU) and a graphic processing unit (GPU), and the hardware information comprises at least one of the voltage information and the frequency information about the hardware;
an analysis module configured to determine a hardware operation mode corresponding to the obtained current hardware information based on the preset relationship between the hardware information of the terminal and the hardware performance of the terminal; and
a control module configured to control the hardware of the terminal in accordance with a determination that the user specified current hardware operation mode is inferior to the determined hardware operation mode for optimizing the terminal's hardware performance by performing at least one of:
enabling the user to replace the user specified current hardware operation mode with the determined hardware operation mode for the current hardware information such that the terminal achieves the hardware performance corresponding to the determined hardware operation mode; and
recommending a list of currently running application programs for the user to adjust the current hardware information by closing one or more of the recommended applications.

9. The device according to claim 8,
wherein the hardware operation modes comprise at least one of a low power consumption mode, a normal mode, a high power consumption mode and an intelligent mode.

10. The device according to claim 9, wherein the low power consumption mode correspond to hardware information in a first preset range;
the normal mode correspond to hardware information in a second preset range;
the high power consumption mode correspond to hardware information in a third preset range; and
the intelligent mode correspond to hardware information in any of the ranges, for switching the hardware operation mode among the low power consumption mode, the normal mode, and the high power consumption mode according to the obtained hardware information;
wherein the first preset range is less than the second preset range and the second preset range is less than the third preset range.

11. The device according to claim 8, further comprising:
the analysis module configured to analyze current performance of the hardware according to the obtained current hardware information; and
a presentation module configured to present an analysis result obtained by the analysis module.

12. The device according to claim 11,
wherein the analysis module is configured to make a query of the stored definitions of hardware operation modes for a performance value corresponding to the obtained hardware information module according to the relationship between the hardware information of the terminal and the hardware performance of the terminal preset by the second setting module, and take the performance value obtained by the query as the analysis result.

13. The device according to claim 8, further comprising:
a prompting module configured to make a prompt about a power consumption warning if the obtained current hardware information module exceeds a threshold.

14. The device according to claim 8, further comprising:
a display module configured to display the list of currently running application programs if the current hardware information obtained by the checking module exceeds a threshold; and
a closing module configured to close an application program selected by the user in the list of application programs displayed by the display module.

15. A non-transitory computer readable storage medium, storing one or more program modules for execution by one or more processors of a computing device for controlling a terminal, the one or more program modules including:
a second setting module configured to receive and store definitions of hardware operation modes, wherein each definition of hardware operation mode specifies a preset relationship between hardware information of the terminal and hardware performance of the terminal;
a first setting module configured to receive a user specification of a current hardware operation mode among the hardware operation modes;
a checking module configured to check hardware of the terminal to obtain current hardware information, wherein the hardware comprises at least one of a central processing unit (CPU) and a graphic processing unit (GPU), and the hardware information comprises at least one of the voltage information and the frequency information about the hardware;
an analysis module configured to determine a hardware operation mode corresponding to the obtained current hardware information based on the preset relationship between the hardware information of the terminal and the hardware performance of the terminal; and
a control module configured to control the hardware of the terminal in accordance with a determination that the user specified current hardware operation mode is inferior to the determined hardware operation mode for optimizing the terminal's hardware performance by performing at least one of:

enabling the user to replace the user specified current hardware operation mode with the determined hardware operation mode for the current hardware information such that the terminal achieves the hardware performance corresponding to the determined hardware operation mode; and recommending a list of currently running application programs for the user to adjust the current hardware information by closing one or more of the recommended applications.

16. The non-transitory computer readable storage medium according to claim 15, wherein the hardware operation modes comprising at least one of a low power consumption mode, a normal mode, a high power consumption mode and an intelligent mode.

17. The non-transitory computer readable storage medium according to claim 16, wherein the low power consumption mode correspond to hardware information in a first preset range;

the normal mode correspond to hardware information in a second preset range;

the high power consumption mode correspond to hardware information in a third preset range; and the intelligent mode correspond to hardware information in any of the ranges, for switching the hardware operation mode among the low power consumption mode, the normal mode, and the high power consumption mode according to the obtained hardware information;

wherein the first preset range is less than the second preset range and the second preset range is less than the third preset range.

18. The non-transitory computer readable storage medium according to claim 15, wherein the one or more program modules further include:

the analysis module configured to analyze current performance of the hardware according to the obtained current hardware information; and a presentation module configured to present an analysis result obtained by the analysis module.

19. The non-transitory computer readable storage medium according to claim 15, wherein the one or more program modules further include:

a prompting module configured to make a prompt about a power consumption warning if the obtained current hardware information module exceeds a threshold.

20. The non-transitory computer readable storage medium according to claim 15, wherein the one or more program modules further include:

a display module configured to display the list of currently running application programs if the current hardware information obtained by the checking module exceeds a threshold; and a closing module configured to close an application program selected by the user in the list of application programs displayed by the display module.

* * * * *